(12) United States Patent
Matsuoka et al.

(10) Patent No.: US 12,263,863 B2
(45) Date of Patent: Apr. 1, 2025

(54) ATTENTION ATTRACTING SYSTEM AND ATTENTION ATTRACTING METHOD

(71) Applicant: HONDA MOTOR CO., LTD., Tokyo (JP)

(72) Inventors: Takahiro Matsuoka, Wako (JP); Ryo Shimoe, Wako (JP); Tsuyoshi Nojiri, Wako (JP); Masayuki Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 42 days.

(21) Appl. No.: 18/463,007

(22) Filed: Sep. 7, 2023

(65) Prior Publication Data
US 2024/0109555 A1 Apr. 4, 2024

(30) Foreign Application Priority Data

Sep. 29, 2022 (JP) .................................. 2022-155826

(51) Int. Cl.
*B60W 50/16* (2020.01)
*B60K 35/00* (2024.01)
(Continued)

(52) U.S. Cl.
CPC ............. *B60W 50/16* (2013.01); *B60K 35/00* (2013.01); *B60W 30/0956* (2013.01); *B60W 40/08* (2013.01); *B60K 35/10* (2024.01); *B60K 35/25* (2024.01); *B60K 35/26* (2024.01); *B60K 35/28* (2024.01); *B60K 35/285* (2024.01); *B60K 35/29* (2024.01); *B60K 2360/149* (2024.01);
(Continued)

(58) Field of Classification Search
CPC .. B60W 50/16; B60W 30/0956; B60W 40/08; B60W 2040/0818; B60W 2050/143; B60W 2050/146; B60W 2540/225; B60W 2540/229; B60W 50/14; B60K 35/00; B60K 35/10; B60K 35/25; B60K 35/26; B60K 35/28; B60K 35/285; B60K 35/29; B60K 2360/149; B60K 2360/178; B60K 2360/1868
See application file for complete search history.

(56) References Cited

U.S. PATENT DOCUMENTS

| 2013/0194127 | A1* | 8/2013 | Ishihara | ............... H01Q 1/3283 342/70 |
| 2018/0134215 | A1* | 5/2018 | Kim | ..................... G07C 5/0825 |
| 2022/0024478 | A1* | 1/2022 | Suzuki | ................... B60K 35/28 |

FOREIGN PATENT DOCUMENTS

JP H10-067301 A 3/1998

\* cited by examiner

*Primary Examiner* — Omeed Alizada
(74) *Attorney, Agent, or Firm* — Rankin, Hill & Clark LLP

(57) ABSTRACT

An attention attracting system includes an attention attracting device that transmits, to a driver, a possibility of contact between a subject vehicle and an object and that includes a risk identification section identifying a risk position which is a position having a strong possibility of contact occurring between the subject vehicle and the object and a risk level which is a degree of the possibility of the contact occurring at the risk position, and a transmission section which transmits the risk position and the risk level to the driver, which provides a tactile stimulus or an auditory stimulus to the driver through a tactile HMI device or an auditory HMI device at a remarkableness level corresponding to height of the risk level, and which transmits, to the driver through a visual HMI device, visual information indicating a direction of the risk position viewed from the driver.

8 Claims, 8 Drawing Sheets

(51) Int. Cl.
*B60K 35/10* (2024.01)
*B60K 35/25* (2024.01)
*B60K 35/26* (2024.01)
*B60K 35/28* (2024.01)
*B60K 35/29* (2024.01)
*B60W 30/095* (2012.01)
*B60W 40/08* (2012.01)
*B60W 50/14* (2020.01)

(52) U.S. Cl.
CPC .................. *B60K 2360/178* (2024.01); *B60K 2360/1868* (2024.01); *B60W 2040/0818* (2013.01); *B60W 2050/143* (2013.01); *B60W 2050/146* (2013.01); *B60W 2540/225* (2020.02); *B60W 2540/229* (2020.02)

FIG.5

| RISK POSITION | | STATE OF DRIVER | | | SELECTION OF HMI DEVICE | | |
|---|---|---|---|---|---|---|---|
| | | ATTENTION-DISTRACTED STATE | VISUAL RECOGNITION OF RISK | EVASIVE STEERING | TACTILE HMI DEVICE | AUDITORY HMI DEVICE | VISUAL HMI DEVICE |
| AHEAD | FIRST STATE | NO | YES | YES | | | |
| | SECOND STATE | NO | NO | NO | USE | | |
| | THIRD STATE | YES | NOT APPLIED | NOT APPLIED | USE | | USE |
| | FOURTH STATE | YES | NOT APPLIED | NOT APPLIED | USE | | USE |
| BEHIND | FIRST STATE | NO | YES | YES | | | |
| | SECOND STATE | NO | NO | NO | | USE | |
| | THIRD STATE | YES | NOT APPLIED | NOT APPLIED | | USE | USE |
| | FOURTH STATE | YES | NOT APPLIED | NOT APPLIED | | USE | USE |

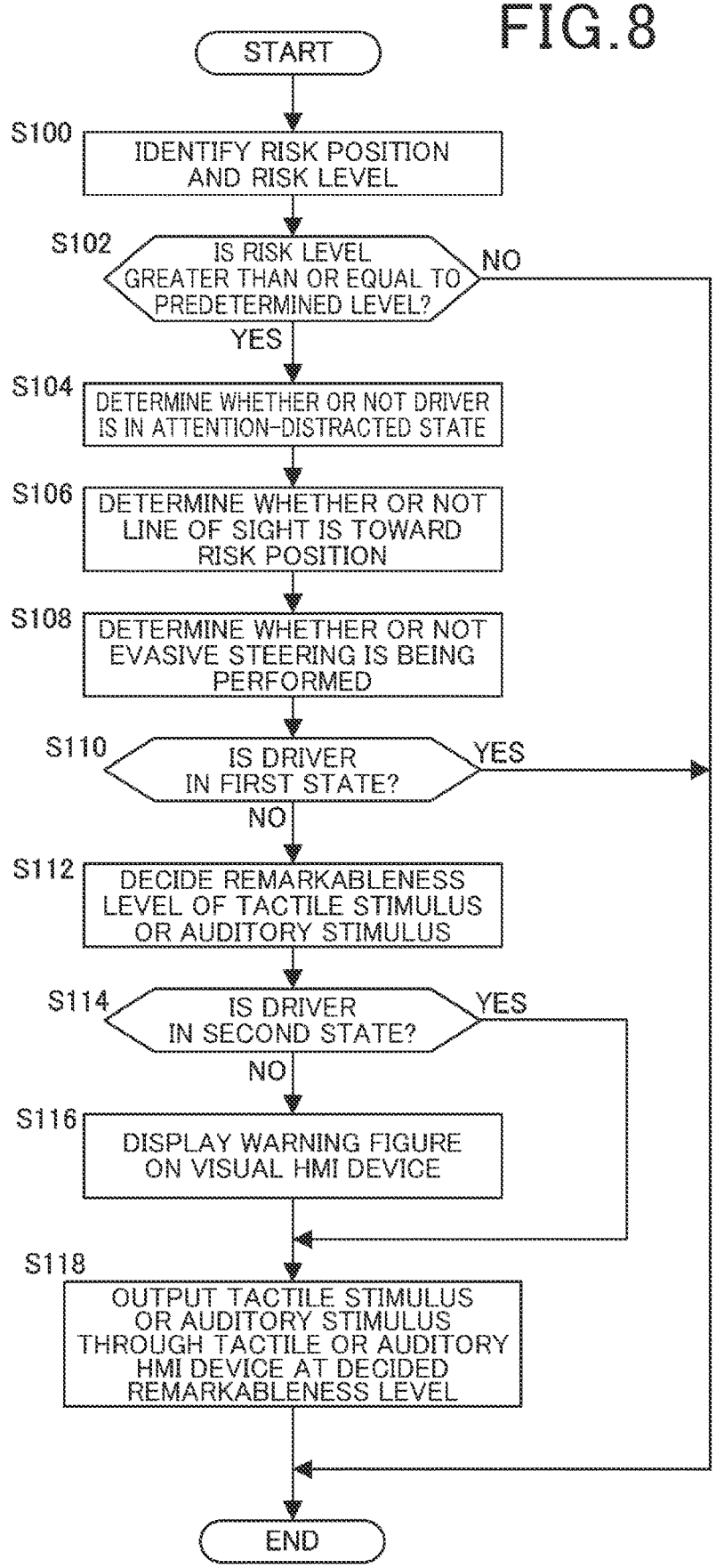

ATTENTION ATTRACTING SYSTEM AND ATTENTION ATTRACTING METHOD

INCORPORATION BY REFERENCE

The present application claims priority under 35 U.S.C. § 119 to Japanese Patent Application No. 2022-155826 filed on Sep. 29, 2022. The content of the application is incorporated herein by reference in its entirety.

BACKGROUND OF THE INVENTION

Field of the Invention

The present invention relates to an attention attracting system and an attention attracting method that each attract the attention of a driver of a vehicle.

Description of the Related Art

In recent years, more active efforts have been made to provide access to a sustainable transportation system that takes into consideration even people at vulnerable positions among traffic participants. To achieve this, efforts have been invested in research and development for still further improving traffic safety and convenience by researching and developing preventive safety technology.

Japanese Patent Laid-Open No. 10-67301 describes that a seat belt tension generation device and a sound generation device issue approach alarms at the same time each for notifying a driver of the approach of a subject vehicle to an object ahead to inform the driver of the approach alarms in a reliable manner that does not cause the driver to have a strange feeling or the like. In addition, Japanese Patent Laid-Open No. 10-67301 describes that the approach alarms are canceled when a certain period of time passes after the approach alarms are issued or when a braking operation is detected.

Incidentally, the preventive safety technology has a goal of transmitting a risk of contact with an object around a subject vehicle to a driver in a manner that does not bother the driver.

To achieve the goal described above, an object of this application is to transmit the risk of the contact with the object around the subject vehicle to the driver in the manner that does not bother the driver while taking into consideration the attention state of the driver. This eventually contributes to the development of the sustainable transportation system.

SUMMARY OF THE INVENTION

An aspect of the present invention is an attention attracting system including: HMI devices that are mounted on a subject vehicle; and an attention attracting device configured to transmit, to a driver, a possibility of contact between the subject vehicle and an object through the HMI devices. The HMI devices include a tactile HMI device, an auditory HMI device, and a visual HMI device. The tactile HMI device provides a stimulus to a tactile perception of the driver. The auditory HMI device outputs sound to the driver. The sound serves as an auditory stimulus. The visual HMI device transmits visual information to the driver. The attention attracting device includes a risk identification section configured to identify a risk position and a risk level, and a transmission section configured to transmit the risk position and the risk level to the driver. The risk position is a position having a strong possibility of contact occurring between the subject vehicle and an object in an environment surrounding the subject vehicle. The risk level is a degree of the possibility of the contact occurring at the risk position. The transmission section provides a tactile stimulus or an auditory stimulus to the driver through the tactile HMI device or the auditory HMI device at a remarkableness level corresponding to strength of the possibility of the contact indicated by the risk level, and transmits visual information to the driver through the visual HMI device. The visual information indicates a direction of the risk position viewed from the driver.

According to another aspect of the present invention, the attention attracting device includes an attention state determination section configured to determine whether or not the driver is in an attention-distracted state, a line-of-sight determination section configured to determine whether or not the driver has a line of sight in the direction of the risk position, and an evasion determination section configured to determine whether or not the driver is performing evasive steering that is an evasive action for evading the contact which is possible contact. The transmission section identifies a state of the driver as any of a first state, a second state, a third state, and a fourth state on the basis of results of determinations by the attention state determination section, the line-of-sight determination section, and the evasion determination section, and provides the tactile stimulus or the auditory stimulus to the driver by using the tactile HMI device or the auditory HMI device unless the state of the driver is the first state. The first state is a state in which the driver is not in the attention-distracted state, has the line of sight in the direction of the risk position, and is performing the evasive steering. The second state is a state in which the driver is not in the attention-distracted state, has the line of sight in the direction of the risk position, and is not performing the evasive steering. The third state being a state in which the driver is not in the attention-distracted state and does not have the line of sight in the direction of the risk position. The fourth state is a state in which the driver is in the attention-distracted state.

According to another aspect of the present invention, the transmission section sets the remarkableness level of the tactile stimulus or the auditory stimulus to be provided to the driver by using the tactile HMI device or the auditory HMI device to cause the remarkableness level to be higher when the driver is in the third state than the remarkableness level set when the driver is in the second state, and the remarkableness level to be higher when the driver is in the fourth state than the remarkableness level set when the driver is in the third state.

According to another aspect of the present invention, when the risk position identified by the risk identification section is located in a region ahead of the subject vehicle, the transmission section provides height of the risk level to the driver through the tactile HMI device as a tactile stimulus, and when the risk position identified by the risk identification section is located in a region other than the region ahead of the subject vehicle, the transmission section provides the height of the risk level to the driver through the auditory HMI device as an auditory stimulus.

According to another aspect of the present invention, when the risk position identified by the risk identification section is located in the region other than the region ahead of the subject vehicle, the line-of-sight determination section determines whether or not the driver has the line of sight in the direction of the risk position through a mirror included in the subject vehicle upon determining that the driver does not have the line of sight in the direction of the risk position.

According to another aspect of the present invention, the tactile HMI device is an electric seat belt that is provided to a driver's seat of the subject vehicle. The electric seat belt provides a tactile stimulus to the driver by changing tension of a seat belt worn by the driver. The remarkableness level of the tactile stimulus corresponds to magnitude of the tension of the seat belt.

According to another aspect of the present invention, the auditory HMI device is a speaker that is provided in a vehicle compartment of the subject vehicle. The remarkableness level of the auditory stimulus corresponds to intensity, height of frequency, and/or shortness of a repetition cycle of sound that is output by the speaker and/or shortness of a change cycle of the intensity or the frequency.

According to another aspect of the present invention, the visual HMI device is a meter display device that is provided in an instrument panel of the subject vehicle. The transmission section displays a predetermined figure on the meter display device, transmits, to the driver, the direction of the risk position viewed from the driver by using a display position of the predetermined figure on the meter display device, and transmits, to the driver, height of the risk level by using a size and/or a color of the predetermined figure on the meter display device. The predetermined figure is for transmitting, to the driver, the possibility of the contact.

Another aspect of the present invention is an attention attracting method that is executed by a computer of an attention attracting system. The attention attracting system includes a tactile HMI device, an auditory HMI device, and a visual HMI device, and an attention attracting device. The tactile HMI device, the auditory HMI device, and the visual HMI device are mounted on a subject vehicle. The tactile HMI device provides a stimulus to a tactile perception of a driver. The auditory HMI device outputs sound to the driver. The sound serves as an auditory stimulus. The visual HMI device transmits visual information to the driver. The attention attracting device is configured to transmit, to the driver, a possibility of contact between the subject vehicle and an object through the tactile HMI device, the auditory HMI device, and/or the visual HMI device. The attention attracting method includes: a risk identification step of identifying a risk position and a risk level; and a transmission step of transmitting the risk position and the risk level to the driver. The risk position is a position having a strong possibility of contact occurring between the subject vehicle and an object in an environment surrounding the subject vehicle. The risk level is a degree of the possibility of the contact occurring at the risk position. In the transmission step, a tactile stimulus or an auditory stimulus is provided to the driver through the tactile HMI device or the auditory HMI device at a remarkableness level corresponding to strength of the possibility of the contact indicated by the risk level, and visual information is transmitted to the driver through the visual HMI device. The visual information indicates a direction of the risk position viewed from the driver.

Advantageous Effects of Invention

According to an aspect of the present invention, it is possible to transmit a risk of contact with an object around a subject vehicle to a driver in a manner that does not bother the driver while taking into consideration an attention state of the driver.

BRIEF DESCRIPTION OF THE DRAWINGS

FIG. 5 is a diagram illustrating an example in which different HMI devices are used in accordance with a state of the driver;

FIG. 8 is a flowchart illustrating a procedure of processing of an attention attracting method that is executed by the attention attracting system.

DETAILED DESCRIPTION OF THE PREFERRED EMBODIMENTS

The following describes embodiments of the present invention with reference to the drawings.

Figure 1:
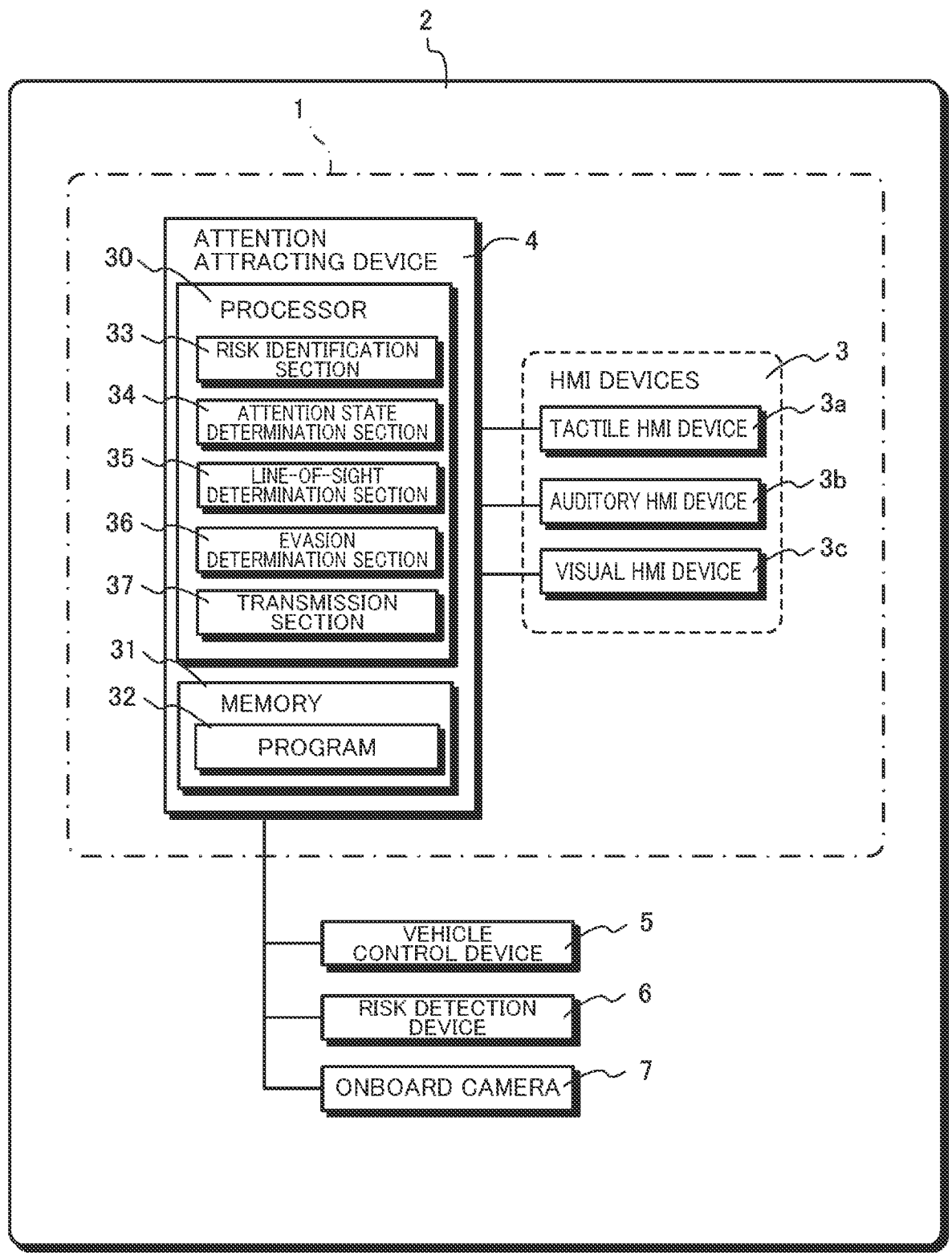
FIG. 1 is a diagram illustrating a configuration of an attention attracting system according to an embodiment of the present invention.
Figure 2:
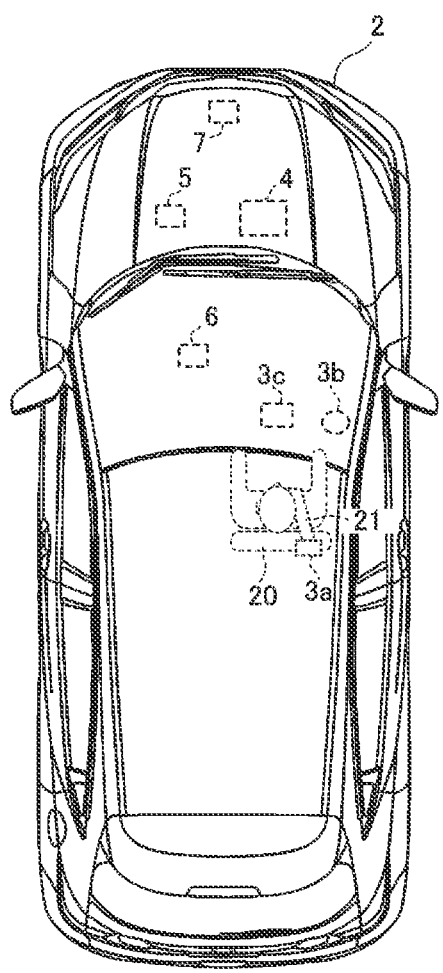
FIG. 2 is a diagram illustrating a configuration of a subject vehicle that is mounted with the attention attracting system.
Figure 3:
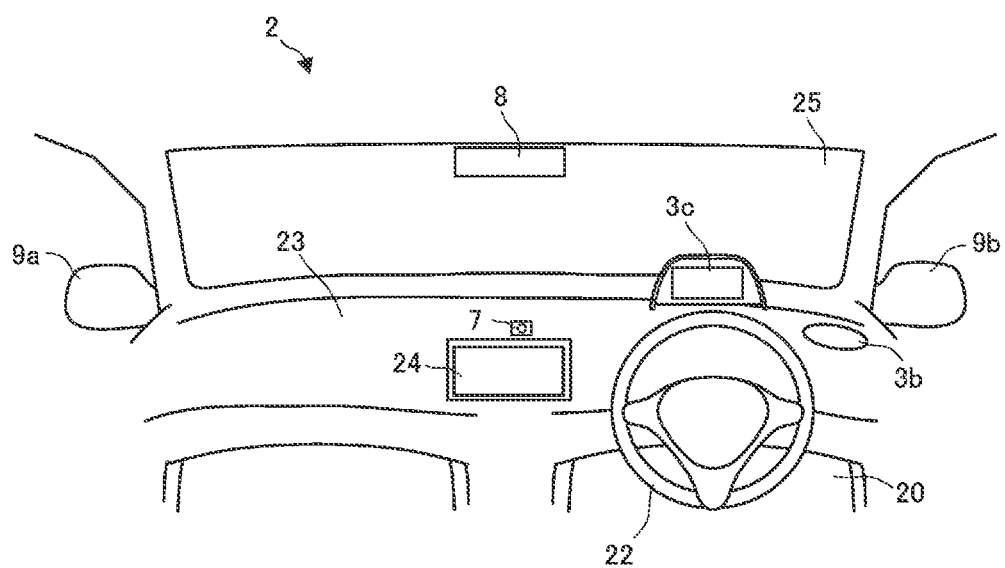
FIG. 3 is a diagram illustrating a configuration of a vehicle compartment of the subject vehicle that is mounted with the attention attracting system.

FIG. 1 is a diagram illustrating a configuration of an attention attracting system 1 according to an embodiment of the present invention. In addition, FIG. 2 is a diagram illustrating a configuration of a subject vehicle 2 that is mounted with the attention attracting system 1 and FIG. 3 is a diagram illustrating a configuration of the vehicle compartment of the subject vehicle 2.

The attention attracting system 1 is mounted on the subject vehicle 2. The attention attracting system 1 transmits, to a driver, a position (that will be referred to as "risk position" below) having a strong possibility of contact occurring between the subject vehicle 2 and an object in an environment surrounding the subject vehicle 2 and a risk level that is the degree of the possibility of the above-described contact occurring at the risk position. Here, the "subject vehicle" means a vehicle mounted with the attention attracting system 1.

The attention attracting system 1 includes HMI devices 3 and an attention attracting device 4 that are mounted on the subject vehicle 2. The HMI devices 3 include a tactile HMI device 3a, an auditory HMI device 3b, and a visual HMI device 3c. The tactile HMI device 3a provides a stimulus to the tactile perception of the driver. The auditory HMI device 3b outputs sound to the driver. The sound serves as an auditory stimulus. The visual HMI device 3c transmits visual information to the driver.

The tactile HMI device 3a is an electric seat belt that is provided, for example, to a driver's seat 20 of the subject vehicle 2 and provides a tactile stimulus to the driver by changing the tension of a seat belt 21 worn by the driver. The electric seat belt is, however, an example. The tactile HMI device 3a may be any device capable of providing a tactile stimulus to the driver. For example, the tactile HMI device 3a may also be a vibration actuator, a massage seat, or the like. The vibration actuator provides vibration to the hands of a driver through a steering wheel 22. The massage seat is provided as the driver's seat 20 and provides a stimulus, for example, by patting, kneading, pressing, or vibrating a body part of a driver such as the back.

In the present embodiment, the auditory HMI device 3*b* is a single speaker. Alternatively, the auditory HMI device 3*b* may be a speaker system including a plurality of speakers.

In the present embodiment, the visual HMI device 3*c* is a meter display device that is provided in an instrument panel 23 of the subject vehicle 2. The meter display device is, however, an example. The visual HMI device 3*c* may be a general-purpose display device 24, a head-up display (not illustrated), or the like. The general-purpose display device 24 displays a reading other than the meter reading. The head-up display displays an image on a windshield 25.

The subject vehicle 2 also includes a vehicle control device 5 (computer) that detects the operation state of a steering operation device such as the accelerator pedal, the brake pedal, the direction indicator lamps, or the steering wheel 22 of the subject vehicle 2 and detects a motion state such as the vehicle speed, the acceleration, or the yaw rate of the subject vehicle 2.

The subject vehicle 2 further includes a risk detection device 6 (computer) that detects the presence of a risk of contact between the subject vehicle 2 and an object (including a traffic participant) in an environment surrounding the subject vehicle 2. The risk detection device 6 identifies a risk position, for example, on the basis of pieces of information from one or more cameras, radars, lidars, and/or sonars distributed to the vehicle body of the subject vehicle 2, positioning data, and map information and calculates a risk level. The positioning data and the map information are acquired from a GPS apparatus and the like (neither of which are illustrated). The risk position is a position having a strong possibility of contact occurring between the subject vehicle 2 and an object. The risk level is the degree of the possibility of the above-described contact occurring at the risk position. The map information described above may include pieces of information related to road shapes such as an intersection, a straight road, and a curve, traffic infrastructure such as a traffic light, the disposition of a building, and the like.

The risk detection device 6 predicts the traffic lines of an object in a surrounding environment and the subject vehicle 2 on the basis of the position, the movement direction, and the speed of the object, the position, the movement direction, and the speed of the subject vehicle 2, the lighting state of a traffic light, and the like, for example, in accordance with traditional technology. The risk detection device 6 may then calculate the risk position and the risk level from the position at which the subject vehicle 2 and the object described above come the closest to each other and the distance between the subject vehicle 2 and the object described above at the position. According to the traditional technology, when the object is a vehicle, the risk detection device 6 may take into consideration the lighting states of the direction indicator lamps and the brake lamps of the vehicle to predict the traffic line of the object. When the object is a pedestrian, the risk detection device 6 may take into consideration the orientation of the face of the pedestrian and the like to predict the traffic line of the object. Similarly, to predict the traffic line of the subject vehicle 2, the risk detection device 6 may take into consideration the lighting states of the direction indicator lamps and the brake lamps of the subject vehicle 2 acquired from the vehicle control device 5. If a navigation device (not illustrated) is guiding a route, the risk detection device 6 may take into consideration the route that is being guided.

In addition, the risk detection device 6 does not only detect a risk of contact between the subject vehicle 2 and an object that is actually detected in an environment surrounding the subject vehicle 2, but may also infer and detect a risk of contact with an object (such as a virtual vehicle or pedestrian) that has not yet been detected, but can appear on the basis of even visibility, the number of accidents, and the like at an intersection or the like.

The subject vehicle 2 is also provided with an onboard camera 7, a rear-view mirror 8, and door mirrors 9*a* and 9*b*. The onboard camera 7 captures an image of the vehicle compartment including the driver. The rear-view mirror 8 is used for the driver to visually recognize a region behind the subject vehicle 2. The door mirrors 9*a* and 9*b* are used for the driver to visually recognize regions behind to the left and right sides of the subject vehicle 2. The rear-view mirror 8 may be a rear-view mirror that displays an image of a back camera (not illustrated) which images the region behind the subject vehicle 2.

The attention attracting device 4 includes a processor 30 and a memory 31. The memory 31 includes, for example, a volatile and/or non-volatile semiconductor memory, and/or a hard disk device, and/or the like. The processor 30 is, for example, a computer including a CPU and the like. The processor 30 may include a ROM in which a program is written, an RAM for temporarily storing data, and the like. The processor 30 then includes a risk identification section 33, an attention state determination section 34, a line-of-sight determination section 35, an evasion determination section 36, and a transmission section 37 as functional elements or functional units.

These functional elements included in the processor 30 are implemented by the processor 30 executing a program 32 stored in the memory 31. The processor 30 is, for example, a computer. It is to be noted that it is possible to store the program 32 in any computer-readable storage medium. Instead of this, it is also possible to configure all or some of the above-described functional elements included in the processor 30 by using hardware including one or more electronic circuit parts.

The risk identification section 33 identifies risk positions and risk levels at predetermined time intervals. The risk positions are positions each having a strong possibility of contact occurring between the subject vehicle 2 and an object in an environment surrounding the subject vehicle 2. The risk level is the degree of the possibility of the above-described contact occurring at the risk position. In the present embodiment, the risk identification section 33 acquires pieces of information related to the risk positions and the risk levels from the risk detection device 6 at the predetermined time intervals to grasp the presence of the risk of the contact and identify the risk position and the risk level at the current time.

Figure 4:
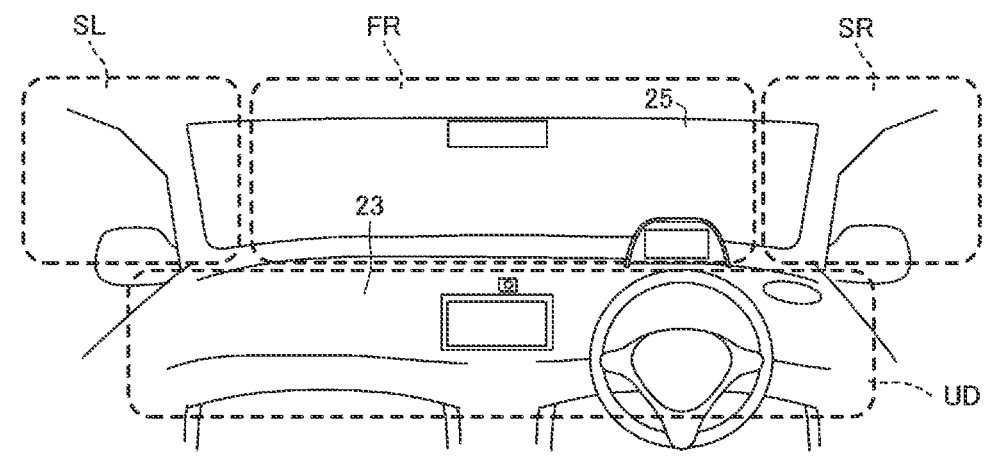
FIG. 4 is a diagram illustrating an example of division of a region in a line-of-sight direction for use to determine an attention-distracted state of a driver.

The attention state determination section 34 determines whether or not the driver of the subject vehicle 2 is in an attention-distracted state. For example, the attention state determination section 34 determines whether or not the driver is in the attention-distracted state on the basis of the direction and the stay time (whether or not the driver's line of sight stays for a predetermined time or more) of the driver's line of sight determined from a face image of the driver from the onboard camera 7. Specifically, as illustrated in FIG. 4, the attention state determination section 34 divides a direction in which the driver casts a line of sight into a front region FR, a left region SL, a right region SR, and a lower region UD. In the front region FR, the left region SL, and the right region SR, the outside world is visually recognizable through the windshield 25 or the like. The lower region UD is a portion of the vehicle compartment including the instrument panel 23 and the like. The attention state determination section 34 may then determine that the driver has the line of sight out of the outside world and is in the attention-distracted state when the driver's line-of-sight direction stays toward the lower region UD. In addition, the attention state determination section 34 may determine that the driver is concentrating on driving and is not in the attention-distracted state when the driver's line-of-sight direction stays toward the front region FR, the left region SL, or the right region SR. It is to be noted that, even if the driver's line-of-sight direction stays toward the front region FR, the left region SL, or the right region SR, the attention state determination section 34 may determine that the driver is in the attention-distracted state when detecting that the driver is feeling sleepy. For example, the attention state determination section 34 may detect that the driver is feeling sleepy from a facial expression of the driver or the blinking frequency in accordance with traditional technology on the basis of a face image of the driver acquired from the onboard camera 7.

The line-of-sight determination section 35 determines whether or not the driver has the line of sight in the direction of the current risk position identified by the risk identification section 33. The line of sight is determined from the face image of the driver from the onboard camera 7.

When the risk position is located in a region (e.g., a region on a side of or behind the subject vehicle 2) other than the region ahead of the subject vehicle 2, it is possible for the line-of-sight determination section 35 to determine not only whether or not the driver has the direct line of sight in the direction of the risk position, but also whether or not the driver has the line of sight in the direction of the risk position through a mirror such as the rear-view mirror 8 or the door mirror 9a or 9b included in the subject vehicle 2. The direct line of sight is determined from the face image of the driver.

It is to be noted that, when the risk position is located in a blind spot which is not visually recognizable to the driver even through a mirror or the like, it is possible for the line-of-sight determination section 35 to constantly determine that the driver does not have the line of sight in the direction of the risk position. Here, information related to the position or region of a blind spot for the subject vehicle 2 may be stored in the memory 31 in advance.

The evasion determination section 36 determines whether or not the driver of the subject vehicle 2 is performing evasive steering that is a steering action for evading possible contact occurring between the subject vehicle 2 and an object at the current risk position identified by the risk identification section 33 (i.e., for evading a risk of contact). For example, the evasion determination section 36 determines whether or not the driver is performing evasive steering from information related to an operation on the brake pedal, the accelerator pedal, and/or the steering wheel acquired from the vehicle control device 5.

The transmission section 37 transmits, to the driver of the subject vehicle 2, the current risk position and risk level with respect to the risk of the contact between the subject vehicle 2 and the object identified by the risk identification section 33.

In the present embodiment, the transmission section 37 in particular provides a tactile stimulus or an auditory stimulus to the driver through the tactile HMI device 3a or the auditory HMI device 3b at a remarkableness level corresponding to the strength of the possibility of the above-described contact indicated by the risk level and transmits, to the driver through the visual HMI device 3c, visual information indicating the direction of the risk position viewed from the driver or visual information indicating the direction of the risk position viewed from the driver and the height of the risk level.

The configuration described above makes it possible to reliably inform the driver of the presence of a risk of contact with a tactile stimulus or an auditory stimulus perceivable to the driver regardless of the attention state of the driver or the driver's line-of-sight direction even when the driver is in an inattention state. Meanwhile, it is possible to inform the driver of the risk of contact for confirmation when the driver is able to concentrate on driving and secondarily inform the driver of the risk position and the height thereof with the visual information. This makes it possible to transmit information related to a risk of contact in a manner that does not bother the driver while taking into consideration even the attention state of the driver.

Here, the remarkableness level is the strength degree to which a stimulus attracts or catches the attention of a person.

For example, when a tactile stimulus is output as the tension of an electric seat belt, the remarkableness level of the tactile stimulus corresponds to the magnitude of the tension described above. As the tension described above increases, the tension provides a tactile stimulus at a higher remarkableness level.

In addition, for example, the remarkableness level of the auditory stimulus corresponds to the intensity, the height of the frequency, and/or the shortness of the repetition cycle of sound that serves as an auditory stimulus and/or the shortness of the change cycle of the intensity or the frequency. As the intensity of sound increases, as the frequency is increases, as the repetition cycle described above decreases, and/or as the change cycle of the intensity or the frequency decreases, the sound provides an auditory stimulus at a higher remarkableness level.

Alternatively, when the tactile stimulus is vibration provided to the hands of the driver from the vibration actuator provided to the steering wheel 22 as described above, the remarkableness level of the tactile stimulus corresponds to the intensity, the height of the frequency, and/or the shortness of the repetition cycle of the vibration and/or the shortness of the change cycle of the intensity or the frequency. As the intensity of vibration increases, as the frequency is increases, as the repetition cycle described above decreases, and/or as the change cycle of the intensity or the frequency decreases, the vibration provides a tactile stimulus at a higher remarkableness level.

Alternatively, when the approach alarm is output as a graphic element such as a character or a figure displayed on the display device, the remarkableness level may be decided on the basis of the luminance of the displayed graphic element, the change cycle of the luminance, the blinking cycle, or the color tint. For example, as the luminance described above increases, the change cycle of the luminance or the blinking cycle decreases, or as the color tint approaches a warm color from a cold color, the approach alarm has a higher remarkableness level.

The transmission section 37 identifies the state of the driver of the subject vehicle 2 as any of the following four states specifically on the basis of results of determinations by the attention state determination section 34, the line-of-sight determination section 35, and the evasion determination section 36:

a first state in which the driver is not in the attention-distracted state, has the line of sight in the direction of the risk position, and is performing the evasive steering;

a second state in which the driver is not in the attention-distracted state, has the line of sight in the direction of the risk position, and is not performing the evasive steering;

a third state in which the driver is not in the attention-distracted state and does not have the line of sight in the direction of the risk position; and a fourth state in which the driver is in the attention-distracted state.

The transmission section 37 then uses any of the tactile HMI device 3a, the auditory HMI device 3b, and the visual HMI device 3c in accordance with which of the four states described above is the state of the driver to transmit, to the driver, the risk position and the risk level with respect to the risk of the contact between the subject vehicle 2 and the object.

FIG. 5 is a diagram illustrating the states of a driver and the HMI devices 3 used by the transmission section 37 for transmission to the driver for the respective risk positions divided into the region ahead of the subject vehicle 2 and the region behind the subject vehicle 2.

The leftmost column of the table illustrated in FIG. 5 has a distinction between a risk position located in the region ahead of the subject vehicle 2 and a risk position located in a region behind the subject vehicle 2. The right side thereof illustrates which of the HMI devices 3 is used when the state of the driver is the first state to the fourth state. In the column of "SELECTION OF HMI DEVICE", a field in which "USE" is written means that the HMI device 3 is used in that state of the driver to output a stimulus. In addition, a blank field in the column of "SELECTION OF HMI DEVICE" means that the HMI device 3 is not used (no stimulus is output) in that state of the driver.

According to the table illustrated in FIG. 5, the transmission section 37 transmits a tactile stimulus to the driver through the tactile HMI device 3a at the remarkableness level corresponding to the height of the risk level, for example, when the risk position is located in the region ahead of the subject vehicle 2. When the risk position is located in the region behind the subject vehicle 2, the transmission section 37 provides an auditory stimulus to the driver described above through the auditory HMI device 3b at the remarkableness level corresponding to the height of the risk level. According to this configuration, the HMI device 3 to be used is switched to the tactile HMI device 3a or the auditory HMI device 3b in accordance with which of the region ahead of the subject vehicle 2 and the region behind the subject vehicle 2 has the risk position. This allows the driver to intuitively grasp which of the region ahead and the region behind has the risk position by receiving any of a tactile stimulus and an auditory stimulus.

Specifically, the transmission section 37 transmits a tactile stimulus or an auditory stimulus to the driver by using the tactile HMI device 3a or the auditory HMI device 3b unless the driver is in the first state (i.e., when the driver is in the second state, the third state, or the fourth state) as illustrated in the table of FIG. 5. According to this configuration, the transmission section 37 refrains from transmitting the risk of the contact to the driver with a tactile stimulus or an auditory stimulus in accordance with the attention state of the driver with respect to the risk of the contact when the driver recognizes the risk of the contact and is performing evasive steering (i.e., when the driver is in the first state). This makes it possible to prevent the driver from being bothered by the unnecessary transmission of the risk of the contact.

Here, it is possible for the transmission section 37 to provide a tactile stimulus or an auditory stimulus to the driver at a different remarkableness level in spite of the same risk level in accordance with which of the second state, the third state, and the fourth state is the driving state.

In the case of the table illustrated in FIG. 5, the transmission section 37 sets the remarkableness level of the tactile stimulus or the auditory stimulus to be provided to the driver by using, for example, the tactile HMI device 3a or the auditory HMI device 3b to cause the remarkableness level to be higher when the driver is in the third state than the remarkableness level set when the driver is in the second state and cause the remarkableness level to be higher when the driver is in the fourth state than the remarkableness level set when the driver is in the third state.

According to this configuration, a tactile stimulus or an auditory stimulus is provided to the driver at a different remarkableness level in accordance with the degree of the attention of the driver to the risk of contact. This makes it possible to transmit information related to the risk of the contact in accordance with the degree of the attention described above in a manner that does not bother the driver.

In addition, in the table illustrated in FIG. 5, the transmission section 37 uses the visual HMI device 3c to transmit, to the driver, visual information indicating the direction of the risk position viewed from the driver when the driver is in the third state or the fourth state, for example, whether the risk position is located in the region ahead of the subject vehicle 2 or the region behind the subject vehicle 2. In this case, the transmission section 37 may also transmit the height of the risk level to the driver as visual information in addition to the direction of the risk position.

Figure 6:
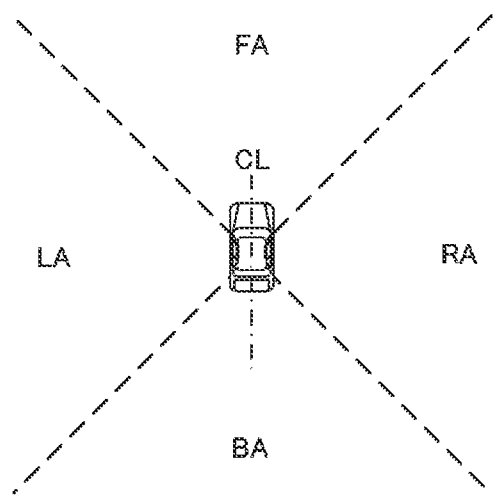
FIG. 6 is a diagram illustrating an example of division of an area around the subject vehicle for defining a direction of a risk position.

For example, the transmission section 37 divides a region surrounding the subject vehicle 2 into the four areas illustrated in FIG. 6 and displays, on the visual HMI device 3c, information indicating in which direction the area having the risk position is located. In FIG. 6, the four areas each having a vertex angle of 90 degrees are defined with the subject vehicle 2 serving as the center.

A front area FA and a back area BA are an area extending ahead of the subject vehicle 2 and an area extending behind the subject vehicle 2, respectively. The front area FA and the back area BA are each defined by two lines that make angles of ±45 degrees to a central line CL in a vehicle width direction. In addition, a left area LA and a right area RA are defined on the left and right of the front area FA and the back area BA.

The transmission section 37 displays a predetermined figure on the visual HMI device 3c for transmitting a possibility of contact between the subject vehicle 2 and an object. The visual HMI device 3c is, for example, a meter display device. The transmission section 37 transmits, to the driver, the direction of the risk position viewed from the driver by using the display position of the figure described above on the meter display device described above and transmits the height of the risk level to the driver by using the color and/or the size of the figure described above on the meter display device described above. According to this configuration, the visual HMI device 3c provides visual information in the same changing manner as that of a tactile stimulus or an auditory stimulus transmitted by the tactile HMI device 3a or the auditory HMI device 3b at the remarkableness level corresponding to the risk level. This allows the driver to recognize the height of the risk level more clearly.

Figure 7A:
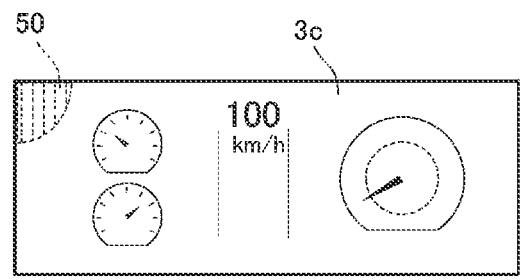
FIGS. 7A to 7C are diagrams each illustrating an example in which a warning figure is displayed in a visual HMI device.
Figure 7B:
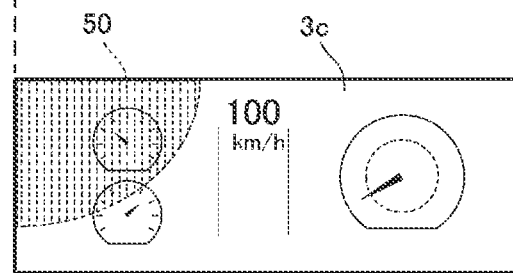
Figure 7C:
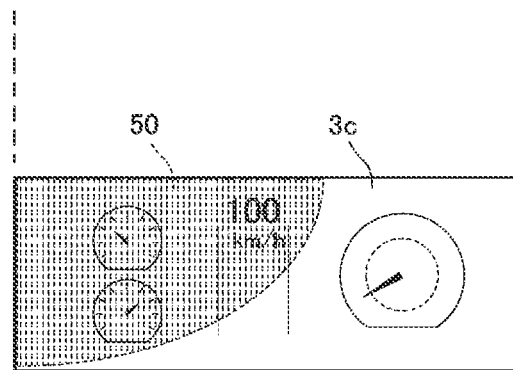

FIGS. 7A to 7C are diagrams each illustrating an example of visual information output by the transmission section 37 to the visual HMI device 3c that is a meter display device. The example of each of FIGS. 7A to 7C illustrates a case where a risk position is located in the left area LA in FIG. 6. In addition, FIGS. 7A, 7B, and 7C illustrate changes in the visual information made when the risk level increases in this order.

Right after a collision risk is detected, the transmission section 37 first displays a small warning FIG. 50 in pale red at the position of the upper left corner of the screen of the visual HMI device 3c as in FIG. 7A, thereby transmitting the presence of the collision risk and the risk position being located in the left area LA of the subject vehicle 2 to the driver.

After that, as the risk level increases, the transmission section 37 expands the warning FIG. 50 (the hatched portion in the diagram) on the screen of the visual HMI device 3c in the right direction of the diagram as in FIG. 7B to increase the warning FIG. 50 in size and change the color of the warning FIG. 50 to dark red.

This increases the color density of the warning FIG. 50 to allow the driver to notice the presence of the warning FIG. 50 more easily and recognize the degree of the increase in the risk level from the degree of the increase in the size of the warning FIG. 50. It is to be noted that FIGS. 7A to 7C each express the increase in the color density of the warning FIG. 50 by using the density of the hatching in the diagram.

When time further passes and the risk level increases to ask for an emergency action on the risk, the transmission section 37 makes a change to further increase the red color density and further increases the warning FIG. 50 in size as in FIG. 7C. It is preferable that the size and the color density of the warning FIG. 50 in this case be large and dark enough to allow even the driver not looking at the screen of the visual HMI device 3c to see the warning FIG. 50 on the edge of the driver's view. In the example of FIG. 7C, the warning FIG. 50 has a large size to extend to the position substantially in the middle of the screen.

It is to be noted that the transmission section 37 may decide the display position of the warning FIG. 50 on the screen described above in accordance with the direction of the risk position. For example, if the risk positions are in the right area RA, the front area FA, and the back area BA, the transmission section 37 may display the respective warning FIG. 50 at the positions of the upper right corner, the middle of the upper side, and the middle of the lower side on the screen described above and increase the warning FIG. 50 in size from the respective positions in accordance with the increases in the risk levels.

Next, a procedure of an operation in the attention attracting system 1 will be described.

FIG. 8 is a flowchart illustrating a procedure of processing in an attention attracting method. The processing is executed by the processor 30 that is a computer of the attention attracting device 4 included in the attention attracting system 1. This processing is repeatedly executed at predetermined time intervals.

Once the processing is started, the risk identification section 33 first identifies a risk position and a risk level on the basis of information from the risk detection device 6 (S100). The risk position is a position having a strong possibility of contact occurring between the subject vehicle 2 and an object in an environment surrounding the subject vehicle 2. The risk level is the degree of the possibility of the above-described contact occurring at the risk position. Subsequently, the risk identification section 33 determines the presence or absence of a risk position whose risk level is greater than or equal to a predetermined level (S102). In the absence of the risk position whose risk level is greater than or equal to the predetermined level (NO in S102), the risk identification section 33 then finishes this processing.

In contrast, in the presence of the risk position whose risk level is greater than or equal to the predetermined level (YES in S102), the attention state determination section 34 determines whether or not the driver is in the attention-distracted state (S104). In addition, the line-of-sight determination section 35 determines whether or not the driver has the line of sight toward the risk position (S106) and the evasion determination section 36 determines whether or not the driver is performing evasive steering (S108).

Subsequently, the transmission section 37 determines whether or not the state of the driver is the first state described above on the basis of results of the determinations in steps S104, S106, and S108 (S110). When the state of the driver is the first state (YES in S110), the transmission section 37 then finishes this processing.

In contrast, when the state of the driver is not the first state (NO in S110), the transmission section 37 decides the remarkableness level of a tactile stimulus or an auditory stimulus to be provided to the driver on the basis of the state of the driver and the risk level at the risk position described above (S112).

Next, the transmission section 37 determines whether or not the state of the driver is the second state (S114). When the state of the driver is not the second state (NO in S114), the predetermined warning FIG. 50 indicating the risk position is then displayed on the visual HMI device 3c at the size corresponding to the risk level (S116). Subsequently, the transmission section 37 transmits the risk level to the driver at the remarkableness level decided in step S112 through the tactile HMI device 3a or the auditory HMI device 3b in accordance with whether the risk position is located in the region ahead of the subject vehicle 2 or the region behind the subject vehicle 2 (S118) to finish this processing.

In contrast, when the state of the driver is the second state in step S114 (YES in S114), the transmission section 37 brings the processing to step S118 and only transmits the risk level through the tactile HMI device 3a or the auditory HMI device 3b to finish this processing without displaying the warning FIG. 50 through the visual HMI device 3c.

It is to be noted that the present invention is not limited to the configurations in the embodiments described above, but it is possible to carry out the present invention in a variety of aspects within the scope that does not depart from the gist of the present invention.

[Configurations Supported by Embodiments Above]

The embodiments described above support the following configurations.

(Configuration 1) An attention attracting system including: HMI devices that are mounted on a subject vehicle; and an attention attracting device configured to transmit, to a driver, a possibility of contact between the subject vehicle and an object through the HMI devices, in which the HMI devices include a tactile HMI device, an auditory HMI device, and a visual HMI device, the tactile HMI device providing a stimulus to a tactile perception of the driver, the auditory HMI device outputting sound to the driver, the sound serving as an auditory stimulus, the visual HMI device transmitting visual information to the driver, the attention attracting device includes a risk identification section configured to identify a risk position and a risk level, the risk position being a position having a strong possibility of contact occurring between the subject vehicle and an object in an environment surrounding the subject vehicle, the risk level being a degree of the possibility of the contact occurring at the risk position, and a transmission section configured to transmit the risk position and the risk level to the driver, and the transmission section provides a tactile stimulus or an auditory stimulus to the driver through the tactile HMI device or the auditory HMI device at a remarkableness level corresponding to strength of the possibility of the contact indicated by the risk level, and transmits visual information to the driver through the visual HMI device, the visual information indicating a direction of the risk position viewed from the driver.

The attention attracting system according to Configuration 1 makes it possible to reliably inform the driver of the presence of a risk of contact with a tactile stimulus or an auditory stimulus perceivable to the driver regardless of the attention state of the driver or the driver's line-of-sight direction even when the driver is in an inattention state. Meanwhile, it is possible to inform the driver of the risk of contact for confirmation when the driver is able to concentrate on driving and secondarily inform the driver of the risk position and the height thereof with the visual information. This makes it possible in the attention attracting system according to Configuration 1 to transmit information related to a risk of contact in a manner that does not bother the driver while taking into consideration even the attention state of the driver.

(Configuration 2) The attention attracting system according to Configuration 1, in which the attention attracting device includes an attention state determination section configured to determine whether or not the driver is in an attention-distracted state, a line-of-sight determination section configured to determine whether or not the driver has a line of sight in the direction of the risk position, and an evasion determination section configured to determine whether or not the driver is performing evasive steering that is an evasive action for evading the contact which is possible contact, and the transmission section identifies a state of the driver as any of a first state, a second state, a third state, and a fourth state on a basis of results of determinations by the attention state determination section, the line-of-sight determination section, and the evasion determination section, the first state being a state in which the driver is not in the attention-distracted state, has the line of sight in the direction of the risk position, and is performing the evasive steering, the second state being a state in which the driver is not in the attention-distracted state, has the line of sight in the direction of the risk position, and is not performing the evasive steering, the third state being a state in which the driver is not in the attention-distracted state and does not have the line of sight in the direction of the risk position, the fourth state being a state in which the driver is in the attention-distracted state, and provides the tactile stimulus or the auditory stimulus to the driver by using the tactile HMI device or the auditory HMI device unless the state of the driver is the first state.

According to the attention attracting system according to Configuration 2, the transmission section refrains from transmitting the risk of the contact to the driver with a tactile stimulus or an auditory stimulus in accordance with the attention state of the driver with respect to the risk of the contact when the driver recognizes the risk of the contact and is performing evasive steering. This makes it possible to prevent the driver from being bothered by the unnecessary transmission of the risk of the contact.

(Configuration 3) The attention attracting system according to Configuration 2, in which the transmission section sets the remarkableness level of the tactile stimulus or the auditory stimulus to be provided to the driver by using the tactile HMI device or the auditory HMI device to cause the remarkableness level to be higher when the driver is in the third state than the remarkableness level set when the driver is in the second state, and the remarkableness level to be higher when the driver is in the fourth state than the remarkableness level set when the driver is in the third state.

According to the attention attracting system according to Configuration 3, a tactile stimulus or an auditory stimulus is provided to the driver at a different remarkableness level in accordance with the degree of the attention of the driver to the risk of contact. This makes it possible to transmit information related to the risk of the contact in accordance with the degree of the attention described above in a manner that does not bother the driver.

(Configuration 4) The attention attracting system according to Configuration 2 or 3, in which when the risk position identified by the risk identification section is located in a region ahead of the subject vehicle, the transmission section provides height of the risk level to the driver through the tactile HMI device as a tactile stimulus, and when the risk position identified by the risk identification section is located in a region other than the region ahead of the subject vehicle, the transmission section provides the height of the risk level to the driver through the auditory HMI device as an auditory stimulus.

According to the attention attracting system according to Configuration 4, the HMI device to be used is switched to the tactile HMI device or the auditory HMI device in accordance with which of the region ahead of the subject vehicle and the region other than the region ahead of the subject vehicle has the risk position. This allows the driver to intuitively grasp which of the region ahead and the region behind has the risk position by receiving any of a tactile stimulus and an auditory stimulus.

(Configuration 5) The attention attracting system according to Configuration 4, in which, when the risk position identified by the risk identification section is located in the region other than the region ahead of the subject vehicle, the line-of-sight determination section determines whether or not the driver has the line of sight in the direction of the risk position through a mirror included in the subject vehicle upon determining that the driver does not have the line of sight in the direction of the risk position.

The attention attracting system according to Configuration 5 makes it possible to appropriately determine whether or not the driver has the line of sight toward the risk position located in the region other than the region ahead of the subject vehicle on the basis of even the driver's line of sight through the mirror included in the subject vehicle.

(Configuration 6) The attention attracting system according to any of Configurations 1 to 5, in which the tactile HMI device is an electric seat belt that is provided to a driver's seat of the subject vehicle, the electric seat belt providing a tactile stimulus to the driver by changing tension of a seat belt worn by the driver, and the remarkableness level of the tactile stimulus corresponds to magnitude of the tension of the seat belt.

The attention attracting system according to Configuration 6 makes it possible to transmit the risk of the contact with a tactile stimulus without adding any equipment special to the driver.

(Configuration 7) The attention attracting system according to any of Configurations 1 to 6, in which the auditory HMI device is a speaker that is provided in a vehicle compartment of the subject vehicle, and the remarkableness level of the auditory stimulus corresponds to intensity, height of frequency, and/or shortness of a repetition cycle of sound that is output by the speaker and/or shortness of a change cycle of the intensity or the frequency.

The attention attracting system according to Configuration 7 makes it possible to transmit the risk of the contact by using the acoustics as the auditory stimulus in various manners.

(Configuration 8) The attention attracting system according to any of Configurations 1 to 7, in which the visual HMI device is a meter display device that is provided in an instrument panel of the subject vehicle, and the transmission section displays a predetermined figure on the meter display device, the predetermined figure being for transmitting, to the driver, the possibility of the contact, transmits, to the driver, the direction of the risk position viewed from the driver by using a display position of the predetermined figure on the meter display device, and transmits, to the driver, height of the risk level by using a size and/or a color of the predetermined figure on the meter display device.

According to the attention attracting system according to Configuration 8, the visual HMI device provides visual information in the same changing manner as that of a tactile stimulus or an auditory stimulus transmitted by the tactile HMI device or the auditory HMI device at the remarkableness level corresponding to the risk level. This allows the driver to recognize the height of the risk level more clearly.

(Configuration 9) An attention attracting method that is executed by a computer of an attention attracting system, the attention attracting system including a tactile HMI device, an auditory HMI device, and a visual HMI device that are mounted on a subject vehicle, the tactile HMI device providing a stimulus to a tactile perception of a driver, the auditory HMI device outputting sound to the driver, the sound serving as an auditory stimulus, the visual HMI device transmitting visual information to the driver, and an attention attracting device configured to transmit, to the driver, a possibility of contact between the subject vehicle and an object through the tactile HMI device, the auditory HMI device, and/or the visual HMI device, the attention attracting method including: a risk identification step of identifying a risk position and a risk level, the risk position being a position having a strong possibility of contact occurring between the subject vehicle and an object in an environment surrounding the subject vehicle, the risk level being a degree of the possibility of the contact occurring at the risk position; and a transmission step of transmitting the risk position and the risk level to the driver, in which in the transmission step, a tactile stimulus or an auditory stimulus is provided to the driver through the tactile HMI device or the auditory HMI device at a remarkableness level corresponding to strength of the possibility of the contact indicated by the risk level, and visual information is transmitted to the driver through the visual HMI device, the visual information indicating a direction of the risk position viewed from the driver.

The attention attracting method according to Configuration 9 makes it possible to reliably inform the driver of the presence of a risk of contact with a tactile stimulus or an auditory stimulus even when the driver is in an inattention state. Meanwhile, it is possible to inform the driver of the risk of contact for confirmation when the driver is able to concentrate on driving and secondarily inform the driver of the risk position and the height thereof with the visual information. This makes it possible in the attention attracting system according to Configuration 1 to transmit information related to a risk of contact in a manner that does not bother the driver while taking into consideration even the attention state of the driver.

REFERENCE SIGNS LIST 1 attention attracting system
2 subject vehicle
3 HMI device
3a tactile HMI device
3b auditory HMI device
3c visual HMI device
4 attention attracting device
5 vehicle control device
6 risk detection device
7 onboard camera
8 rear-view mirror
9a, 9b door mirror
20 driver's seat
21 seat belt
22 steering wheel
23 instrument panel
24 display device
25 windshield
30 processor
31 memory
32 program
33 risk identification section
34 attention state determination section
35 line-of-sight determination section
36 evasion determination section
37 transmission section
50 warning figure

What is claimed is:
1. An attention attracting system comprising:
HMI devices that are mounted on a subject vehicle; and
an attention attracting device configured to transmit, to a driver, a possibility of contact between the subject vehicle and an object through the HMI devices, wherein
the HMI devices include a tactile HMI device, an auditory HMI device, and a visual HMI device, the tactile HMI device providing a stimulus to a tactile perception of the driver, the auditory HMI device outputting sound to the driver, the sound serving as an auditory stimulus, the visual HMI device transmitting visual information to the driver,
the attention attracting device includes
a risk identification section configured to identify a risk position and a risk level, the risk position being a position having a strong possibility of contact occurring between the subject vehicle and an object in an environment surrounding the subject vehicle, the risk level being a degree of the possibility of the contact occurring at the risk position, and
a transmission section configured to transmit the risk position and the risk level to the driver, and
the transmission section
provides a tactile stimulus or an auditory stimulus to the driver through the tactile HMI device or the auditory HMI device at a remarkableness level corresponding to strength of the possibility of the contact indicated by the risk level, and transmits visual information to the driver through the visual HMI device, the visual information indicating a direction of the risk position viewed from the driver, the attention attracting device includes an attention state determination section configured to determine whether or not the driver is in an attention-distracted state, a line-of-sight determination section configured to determine whether or not the driver has a line of sight in the direction of the risk position, and an evasion determination section configured to determine whether or not the driver is performing evasive steering that is an evasive action for evading the contact which is possible contact, and the transmission section identifies a state of the driver as any of a first state, a second state, a third state, and a fourth state on a basis of results of determinations by the attention state determination section, the line-of-sight determination section, and the evasion determination section, the first state being a state in which the driver is not in the attention-distracted state, has the line of sight in the direction of the risk position, and is performing the evasive steering, the second state being a state in which the driver is not in the attention-distracted state, has the line of sight in the direction of the risk position, and is not performing the evasive steering, the third state being a state in which the driver is not in the attention-distracted state and does not have the line of sight in the direction of the risk position, the fourth state being a state in which the driver is in the attention-distracted state, and provides the tactile stimulus or the auditory stimulus to the driver by using the tactile HMI device or the auditory HMI device unless the state of the driver is the first state.

2. The attention attracting system according to claim 1, wherein the transmission section sets the remarkableness level of the tactile stimulus or the auditory stimulus to be provided to the driver by using the tactile HMI device or the auditory HMI device to cause the remarkableness level to be higher when the driver is in the third state than the remarkableness level set when the driver is in the second state, and the remarkableness level to be higher when the driver is in the fourth state than the remarkableness level set when the driver is in the third state.

3. The attention attracting system according to claim 1, wherein when the risk position identified by the risk identification section is located in a region ahead of the subject vehicle, the transmission section provides height of the risk level to the driver through the tactile HMI device as a tactile stimulus, and when the risk position identified by the risk identification section is located in a region other than the region ahead of the subject vehicle, the transmission section provides the height of the risk level to the driver through the auditory HMI device as an auditory stimulus.

4. The attention attracting system according to claim 3, wherein, when the risk position identified by the risk identification section is located in the region other than the region ahead of the subject vehicle, the line-of-sight determination section determines whether or not the driver has the line of sight in the direction of the risk position through a mirror included in the subject vehicle upon determining that the driver does not have the line of sight in the direction of the risk position.

5. The attention attracting system according to claim 1, wherein the tactile HMI device is an electric seat belt that is provided to a driver's seat of the subject vehicle, the electric seat belt providing a tactile stimulus to the driver by changing tension of a seat belt worn by the driver, and the remarkableness level of the tactile stimulus corresponds to magnitude of the tension of the seat belt.

6. The attention attracting system according to claim 1, wherein the auditory HMI device is a speaker that is provided in a vehicle compartment of the subject vehicle, and the remarkableness level of the auditory stimulus corresponds to intensity, height of frequency, and/or shortness of a repetition cycle of sound that is output by the speaker and/or shortness of a change cycle of the intensity or the frequency.

7. The attention attracting system according to claim 1, wherein the visual HMI device is a meter display device that is provided in an instrument panel of the subject vehicle, and the transmission section displays a predetermined figure on the meter display device, the predetermined figure being for transmitting, to the driver, the possibility of the contact, transmits, to the driver, the direction of the risk position viewed from the driver by using a display position of the predetermined figure on the meter display device, and transmits, to the driver, height of the risk level by using a size and/or a color of the predetermined figure on the meter display device.

8. An attention attracting method that is executed by a computer of an attention attracting system, the attention attracting system including a tactile HMI device, an auditory HMI device, and a visual HMI device that are mounted on a subject vehicle, the tactile HMI device providing a stimulus to a tactile perception of a driver, the auditory HMI device outputting sound to the driver, the sound serving as an auditory stimulus, the visual HMI device transmitting visual information to the driver, and an attention attracting device configured to transmit, to the driver, a possibility of contact between the subject vehicle and an object through the tactile HMI device, the auditory HMI device, and/or the visual HMI device, the attention attracting method comprising:

a risk identification step of identifying a risk position and a risk level, the risk position being a position having a strong possibility of contact occurring between the subject vehicle and an object in an environment surrounding the subject vehicle, the risk level being a degree of the possibility of the contact occurring at the risk position; and a transmission step of transmitting the risk position and the risk level to the driver, wherein in the transmission step, a tactile stimulus or an auditory stimulus is provided to the driver through the tactile HMI device or the auditory HMI device at a remarkableness level corresponding to strength of the possibility of the contact indicated by the risk level, and visual information is transmitted to the driver through the visual HMI device, the visual information indicating a direction of the risk position viewed from the driver, the risk identification step includes:

determining whether or not the driver is in an attention-distracted state, determining whether or not the driver has a line of sight in the direction of the risk position, and determining whether or not the driver is performing evasive steering that is an evasive action for evading the contact which is possible contact, and the transmission step includes:

identifying a state of the driver as any of a first state, a second state, a third state, and a fourth state on a basis of results of determinations in the risk identification step, the first state being a state in which the driver is not in the attention-distracted state, has the line of sight in the direction of the risk position, and is performing the evasive steering, the second state being a state in which the driver is not in the attention-distracted state, has the line of sight in the direction of the risk position, and is not performing the evasive steering, the third state being a state in which the driver is not in the attention-distracted state and does not have the line of sight in the direction of the risk position, the fourth state being a state in which the driver is in the attention-distracted state, and providing the tactile stimulus or the auditory stimulus to the driver by using the tactile HMI device or the auditory HMI device unless the state of the driver is the first state.

\* \* \* \* \*